Oct. 19, 1926.

W. L. ADAMS 1,603,306

FISHING REEL

Filed Nov. 25, 1922    2 Sheets-Sheet 1

Inventor
Walter L. Adams
By
Brockett, Hyde & Milburn
Att'ys

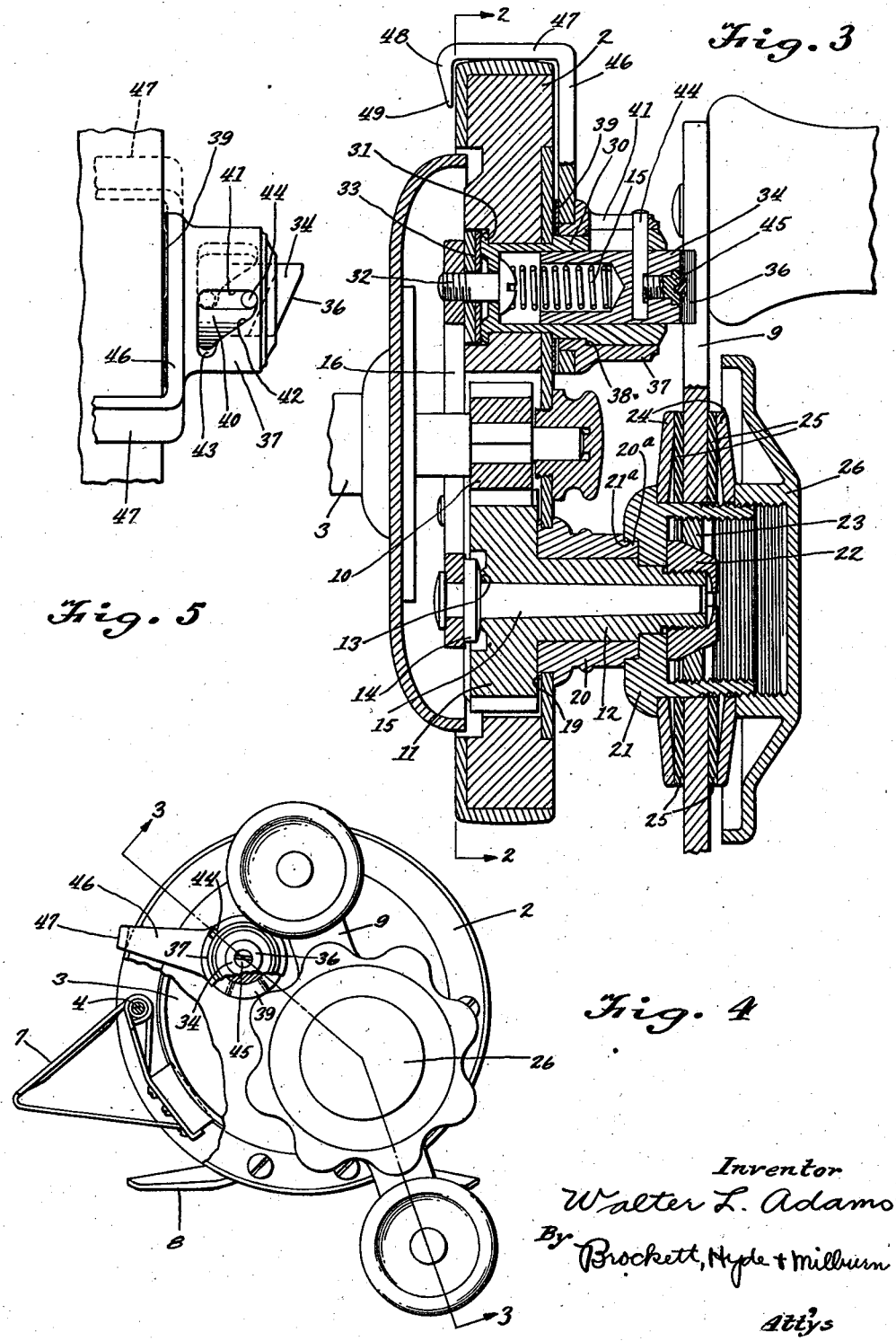

Patented Oct. 19, 1926.

1,603,306

UNITED STATES PATENT OFFICE.

WALTER L. ADAMS, OF AKRON, OHIO, ASSIGNOR TO THE ENTERPRISE MANUFACTURING COMPANY, OF AKRON, OHIO, A CORPORATION OF OHIO.

FISHING REEL.

Application filed November 25, 1922. Serial No. 603,230.

This invention relates to fishing reels and more particularly to drag mechanism therefor rendered effective by suitable means for preventing the operating handle from rotating in the backward or line unwinding direction.

The objects of the invention are to provide improved means for preventing backward rotation of the operating handle so arranged as to be capable of being thrown into and out of operation by a simple movement and regardless of and unaffected by whether said handle is rotating or not; to provide improved means for holding the latch or drag mechanism in operative or inoperative position; and to improve the construction of the latch so as to simplify the same, reduce the number of parts and enable it to be readily controlled and manipulated.

A further object of the invention is to provide a handle controlling latch pin actuated by cam means, and more particularly by cam means centered around or concentric with a latch pin and therefore of more compact form than prior devices of this kind.

A further object of this invention is to provide an operating handle or lever for rendering effective a drag or other reel mechanism and which lever or handle has an operating portion located at and embracing the periphery of one of the reel frame heads, the arrangement being such that the line is not likely to catch or become tangled with said lever.

Further objects of the invention are in part obvious and in part will appear more in detail hereinafter.

Figure 2:
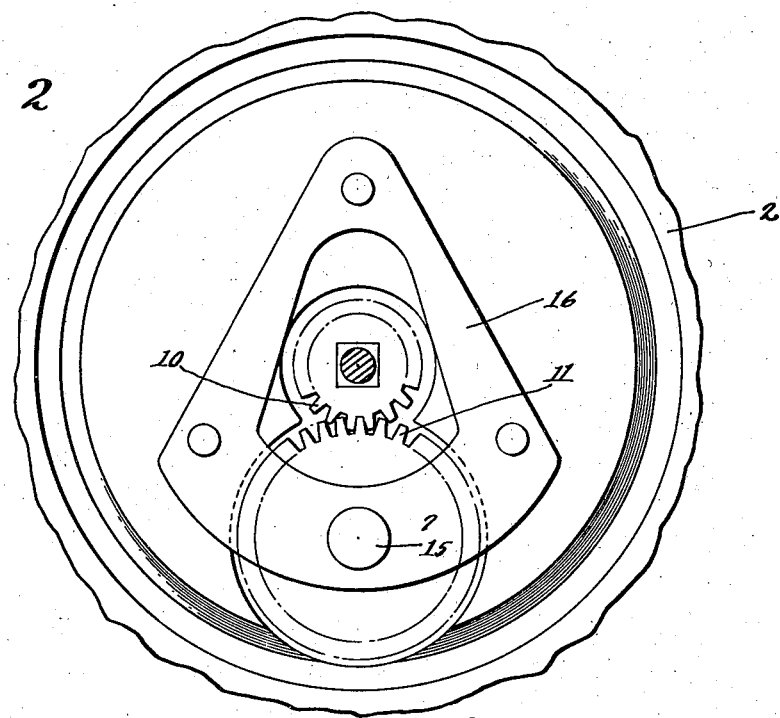
Figure 1:
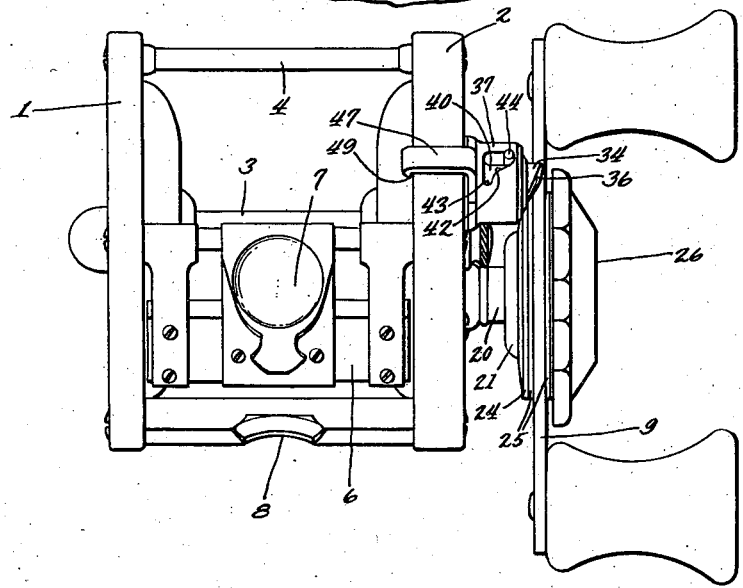

Fig. 1 is a front elevation of my improved reel; Fig. 2 is a detail sectional view on line 2—2, Fig. 3; Fig. 3 is a sectional view on the line 3—3, Fig. 4; Fig. 4 is an end view; and Fig. 5 is a detail elevation of the cam mechanism for actuating the stop pin.

The end heads 1 and 2 within which the spool 3 is rotatably mounted, are connected by means of the usual pillars 4, on one of which is pivotally mounted the brake 6 effective on the spool heads and to be manipulated by the thumb of the operator engaging the arms of the angular portion 7. The reel is attached to the rod by means of the usual curved plate 8. The spool is operated by the crank or handle 9, there being the well known combination of gears between the shafts of the handle and spool for operation of the latter. Pinion 10 on the spool shaft is driven by gear 11 provided with a hub 12. The gear 11 has the bead 13 engaging the beveled surface of a collar 14 on post 15 which is suitably attached, as by riveting, to the bridge member 16. The other face of gear 11 engages the beaded end portion 19 of the sleeve 20 fixed in an opening in the end head and through which extends the hub of gear 11.

Gear 11 rotates on post 15 and the hub thereof extends outwardly beyond the end of member 20, its projecting portion having attached thereto the operating handle 9. As shown, the manner of attachment of said handle to the gear hub is such as to provide a friction drag between the handle and gear, for a purpose which will appear. As illustrated the hub of gear 11 has a squared portion at its outer end on which is mounted to rotate with the gear a cap member 21 fastened to the gear hub by a nut 22 and lock nut 23. Member 21 is also recessed annularly at 21$^a$ to telescope over the reduced end portion 20$^a$ of member 20, which thereby forms a firm support and bearing for the rotating parts and prevents any tendency toward lateral strain or bending effect on the post 15, such as occurs with heavy strains in reeling in a big fish. Also, the external bearing at 20$^a$ seals entrance to the inner bearing between the gear extension 12 and member 20 and prevents the entrance of grit, dirt and the like thereto. The periphery of member 21 is threaded and flattened off on two sides to receive the non-rotatable dished resilient washers 24 between which is located the handle member 9 having a rounded opening so that it can turn on member 21. 25 represents a pair of washers of suitable friction material, such as fibre or fibre composition, located between the handle and the dished washers 24. Said friction washers are pressed against the handle by the cap nut 26, having a notched periphery, as shown in Fig. 4 for convenient manipulation by the fingers. By screwing up this cap the amount of friction or drag between the operating handle and the gear 11 may be adjusted to any desired amount. Therefore, by holding the operating handle either with the hands or by the latch pin to be described the spool may be unwound by a fish only by overcoming the friction or drag in the handle. This arrangement is not only useful in playing a fish but the drag can be adjusted to an amount such that the spool will unwind before the line breaks.

The present reel as before stated is provided with suitable means adapted to be moved to an operative position or condition in which it prevents the operating handle from rotating in the backward or line unwinding direction but at the same time will permit said handle to be rotated for winding in the line, and which stop means may also be moved to an inoperative position. This stop device will now be described.

The frame head in which the driving gears are located is provided with a sleeve 30 permanently attached to the head by beading over its end, as at 31. Said sleeve is also anchored to the bridge 16 by a screw 32 having its head lying within the sleeve and threaded into the bridge through openings in washer members 33. Within the sleeve is telescoped a pin or latch member 34 chambered to receive the compression spring 35 and having its outer end beveled, as indicated at 36, Fig. 1. When said pin is projected to its full extent its beveled end lies within the path of rotation of the crank or handle 9 and prevents said handle from being turned in the backward direction, but if the handle is turned in the forward direction to wind in the line it passes over the pivoted portion of the pin and pushes the same back into the cavity of the sleeve 34.

Suitable means is provided for rendering said latch pin effective or ineffective. The means shown comprises a cammed sleeve 37 surrounding the stationary sleeve 30 and permanently sleeved thereon by the interlocking shoulders 38. Between the heads of said sleeve and the frame head is a corrugated resilient washer 39 adapted to exert a retarding or friction effect upon the sleeve and maintain it against accidental movement from any position in which it is set. Said sleeve 37 is provided with an opening 40 therein having a straight wall 41 extending upwardly with the axis of the stop pin, an inclined or cam wall 42 and a notch or recess 43. The walls of said opening cooperate with a pin 44 extending radially from the stop pin 34 and held therein by a set screw 45. 46 represents an actuating handle or lever for the cam sleeve, said lever extending radially outwardly to the periphery of the frame head and having its outer end bent laterally across said head, as at 47 and inwardly along the inner base thereof, as at 48, the far end of the lever being beveled as at 49.

By placing the thumb upon the straight portion 47 of the lever which extends across the frame head, said lever may be turned about the axis of the stop pin 34 to render the same effective or ineffective. In the position shown in the drawings the cam sleeve is in operative position because it has been turned to a position in which the pin 44 lies alongside of the straight wall 41 of the cam opening. Consequently the stop pin 34 has free movement axially of the sleeve 30 against the pressure of spring 35. The operating handle 9 can therefore be rotated in the line winding direction, but the stop pin prevents it from rotating in the backward direction and renders the drag mechanism in the handle effective.

This straight portion 47 moves upwardly in Fig. 1, the inclined wall 42 exerts a camming effect upon pin 44 and pushes the same to the left, causing it to finally enter the notch or recess 43. In this position the stop pin is held ineffective and the operating handle 49 operates freely in either direction.

It will be apparent that the stop pin can be made effective or ineffective by applying the thumb of the left hand thereto regardless of whether the handle 49 or not is rotated. If it happens that the reel is being used with the stop pin or latch in inoperative position and a fish accidentally runs out with the line, lever 46 may be actuated with the left hand to suddenly render the stop pin effective, whereupon the fish is immediately subjected to the effect of the drag mechanism.

The actuating cam mechanism for the stop pin is centered around said stop pin and is therefore of simple construction.

What I claim is:—

1. A fishing reel structure comprising end heads, a spool rotatably mounted in one of said heads, a driving crank for operating said spool, adjustable stop means upon one of said heads adapted to be set so as to prevent unwinding operation of said crank, and a lever for setting said stop means, the end portion of said lever embracing the peripheral portion of one of said heads so as to permit actuation of the same by the operator without intercepting the path of said crank.

2. A fishing reel structure comprising end heads, a spool rotatably mounted in said heads, means for operating said spool, adjustable means upon one of said heads adapted to be set so as to permit said spool to be operated only for winding in the line, and a lever for setting said stop means, the free end portion of said lever extending across the periphery of the end head so as to be capable of actuation without interference with said spool operating means.

3. A fishing reel, comprising a frame including end heads, a rotatable spool, an operating handle therefor, a yielding stop device co-operating with said handle, and control means for said device rotatable around the same.

4. A fishing reel, comprising a frame including end heads, a rotatable spool, an operating handle therefor, a yielding stop device co-operating with said handle, and control means for said device rotatable around the same, and having an operating lever provided with a portion embracing one of the frame heads.

5. A fishing reel, comprising a frame including end heads, a rotatable spool, an operating handle therefor, a sleeve on one of the frame heads, a yielding stop device telescoping said sleeve, and a cam sleeve swiveled to said first named sleeve for controlling said stop device.

6. A fishing reel, comprising a frame including end heads, a rotatable spool, an operating handle therefor, a sleeve on one of the frame heads, a yielding stop device telescoping said sleeve, and a cam sleeve swiveled to said first named sleeve for controlling said stop device, said stop device having a laterally extending pin, and said cam sleeve having an opening provided with an inclined cam edge for engaging said pin.

7. A fishing reel, comprising a frame including end heads, a rotatable spool, an operating handle therefor, a sleeve on one of the frame heads, a yielding stop device telescoping said sleeve, and a cam sleeve swiveled to said first named sleeve for controlling said stop device, said stop device having a laterally extending pin, and said cam sleeve having an opening provided with an inclined cam edge for engaging said pin, and a recess at one end of said inclined edge for holding said device retracted.

8. A fishing reel, comprising a frame including end heads, a rotatable spool, an operating handle therefor, a sleeve on one of the frame heads, a yielding stop device telescoping said sleeve, and a cam sleeve swiveled to said first named sleeve for controlling said stop device, said stop device having a laterally extending pin, and said cam sleeve having an opening provided with an inclined cam edge for engaging said pin, and a straight portion along which the pin slides during operating movement of said device.

9. A fishing reel, comprising a frame including end heads, a rotatable spool, an operating handle therefor, a sleeve on one of the frame heads, a yielding stop device telescoping said sleeve, a cam sleeve swiveled to said first named sleeve for controlling said stop device, and a friction washer for holding said cam sleeve in any position in which it is set.

In testimony whereof I hereby affix my signature.

WALTER L. ADAMS.